United States Patent
Kim et al.

(10) Patent No.: US 7,142,845 B2
(45) Date of Patent: Nov. 28, 2006

(54) METHOD OF AUTOMATICALLY REGISTERING ADDRESS INFORMATION OF MOBILE COMMUNICATION TERMINAL

(75) Inventors: Dong Suk Kim, Seoul (KR); Su Hyun Yim, Seoul (KR)

(73) Assignee: Curitel Communications, Inc., Kyungki-Do (KR)

( * ) Notice: Subject to any disclaimer, the term of this patent is extended or adjusted under 35 U.S.C. 154(b) by 310 days.

(21) Appl. No.: 10/820,273

(22) Filed: Apr. 8, 2004

(65) Prior Publication Data

US 2005/0090253 A1    Apr. 28, 2005

(30) Foreign Application Priority Data

Oct. 24, 2003    (KR)    ............... 10-2003-0074809

(51) Int. Cl.
*H04Q 7/20*    (2006.01)
(52) U.S. Cl. .............. 455/415; 455/417; 455/412.1
(58) Field of Classification Search ........... 455/403, 455/412.1, 412.2, 414.1, 415, 417, 432.3, 455/433, 435.1, 445, 458, 459, 556.2, 420, 455/419

See application file for complete search history.

(56) References Cited

U.S. PATENT DOCUMENTS

| | | | | |
|---|---|---|---|---|
| 6,295,458 B1 * | 9/2001 | Takahashi | ............... | 455/466 |
| 6,658,251 B1 * | 12/2003 | Lee et al. | ............... | 455/435.1 |
| 2001/0000538 A1 * | 4/2001 | Kowaguchi | ............... | 709/245 |
| 2002/0090972 A1 * | 7/2002 | Kuramatsu | ............... | 455/550 |
| 2003/0091167 A1 * | 5/2003 | Hirai | ............... | 379/93.01 |
| 2003/0139171 A1 * | 7/2003 | Kuita | ............... | 455/411 |
| 2003/0203744 A1 * | 10/2003 | Otsuka | ............... | 455/551 |
| 2004/0017907 A1 * | 1/2004 | Niizato et al. | ............... | 379/201.01 |
| 2004/0203613 A1 * | 10/2004 | Zhu et al. | ............... | 455/412.1 |

FOREIGN PATENT DOCUMENTS

| | | |
|---|---|---|
| KR | 1020030024006 | 3/2003 |
| KR | 1020030033231 | 5/2003 |

* cited by examiner

*Primary Examiner*—Jean Gelin
(74) *Attorney, Agent, or Firm*—Ohlandt, Greeley, Ruggiero & Perle, L.L.P.

(57) ABSTRACT

Disclosed is a method of automatically registering address information of a mobile communication terminal. The method comprises: generating an address information registering message at an originating mobile communication terminal by adding an identifier to transmission information and transmitting the address information registering message from an originating mobile communication terminal; and at a called mobile communication terminal, receiving the address information registering message, checking whether or not an address information registering message service is available, and registering the transmission information with an address book, whereby it is convenient for the user to register the address information, which is allowed to satisfy requests of the user caused by increase of the short message service.

13 Claims, 4 Drawing Sheets

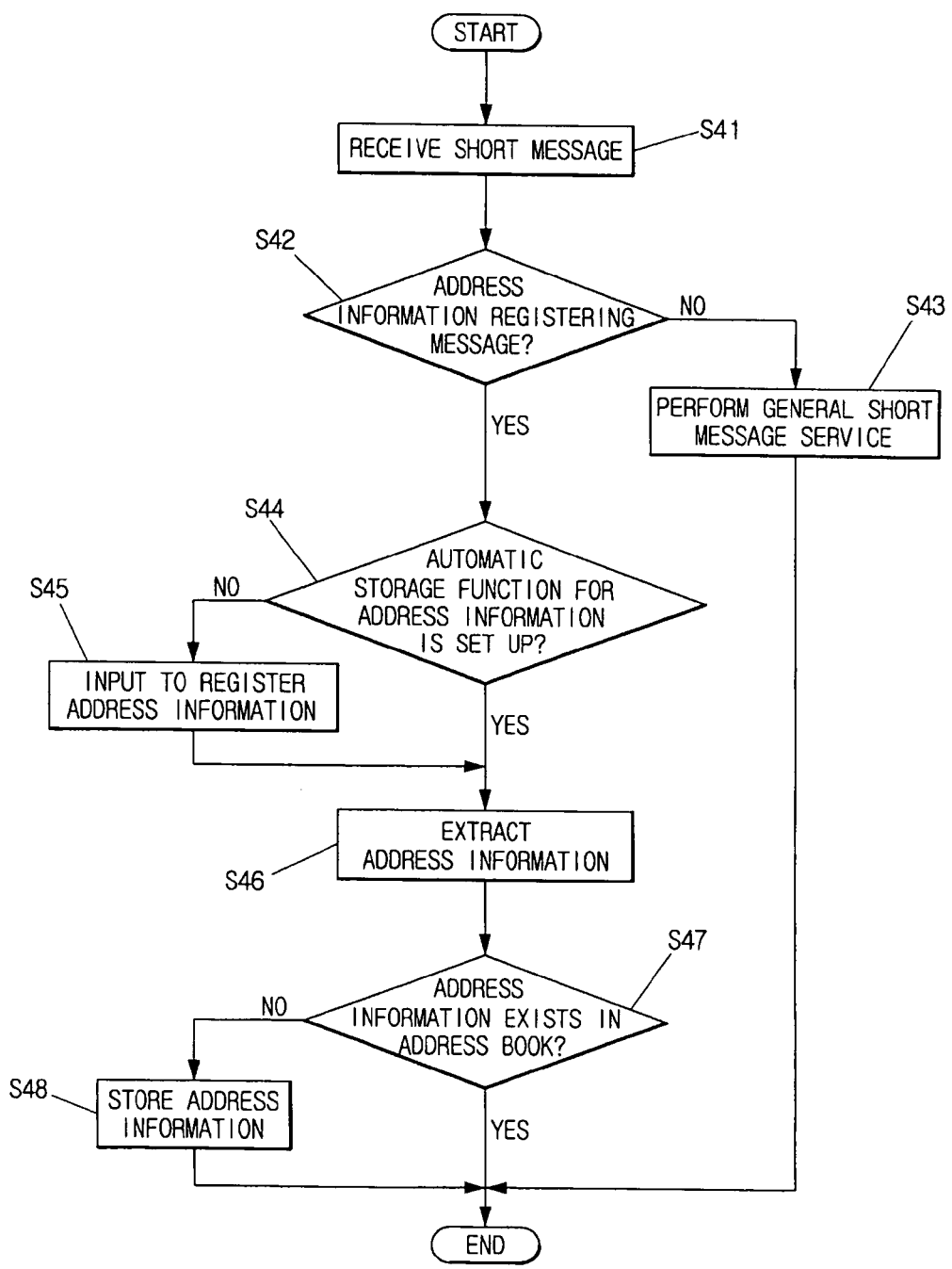

METHOD OF AUTOMATICALLY REGISTERING ADDRESS INFORMATION OF MOBILE COMMUNICATION TERMINAL

CROSS-REFERENCE TO RELATED APPLICATION

The entire disclosure of Korean Patent Application No. 10-2003-0074809 filed on Oct. 24, 2003 including specification, claims, drawings and summary, is incorporated herein by reference in its entirety.

BACKGROUND OF THE INVENTION

1. Field of the Invention

The present invention relates to a method of automatically registering address information of a mobile communication terminal, in which address information is automatically registered in a mobile communication terminal with the use of a short message.

2. Description of the Related Art

Generally, a memory of a mobile communication terminal includes an address book in which various information of a calling person (i.e., caller), such as a phone number of the caller and so forth, are stored. A subject who registers the information with the address book is commonly a user or owner of the mobile communication terminal. To register the information, the user takes some trouble to sequentially manipulate several keys, which constitute a key pad of the mobile communication terminal.

As such, in the case of the conventional mobile communication terminal, when information of the caller, for example a phone number of the caller, has been registered with an address book of a mobile communication terminal for a recipient, the recipient has been compelled to take the trouble to directly register the caller-side phone number by manipulating such keys.

Additionally, in the prior art, it is true that technique for informing the mobile communication terminal users of their mutual phone numbers has not been developed up to such a level that the users can easily used.

BRIEF SUMMARY OF THE INVENTION

Accordingly, the present invention has been made to solve the above-mentioned problems occurring in the prior art, and an object of the present invention is to provide a method of automatically registering address information of a mobile communication terminal, capable of automatically registering the address information with the use of a short message in a mobile communication terminal.

It is another object of the present invention to provide a method of automatically registering address information of a mobile communication terminal, in which a short message containing a phone number at the mobile communication terminal is transmitted to a correspondent, and the phone number is automatically registered with an address book of the correspondent mobile communication terminal, and thereby it is convenient for the user to register the address information, which is allowed to satisfy requests of the user caused by increase of the short message service.

In order to accomplish these objects, according to one aspect of the present invention, there is provided a method of automatically address information of a mobile communication terminal, including: generating an address information registering message at an originating mobile communication terminal by adding an identifier to transmission information and transmitting the address information registering message from the originating mobile communication terminal; and at a called mobile communication terminal, receiving the address information registering message, checking whether or not an address information registering message service is available, and registering the transmission information with an address book.

Preferably, the method further includes, when the address information registering message service is not available, transmitting a return message from the called mobile communication terminal to the originating mobile communication terminal and informing the originating mobile communication terminal that registration of the address information is not accepted.

More preferably, said transmitting the address information registering message includes: waiting for an originator's selection of a menu of 'sending address information'; displaying an input screen and receiving the address information to be added to a content of a short message by the originator's input; and generating the address information registering message by adding the identifier to the short message and transmitting the generated address information registering message to the called mobile communication terminal.

Preferably, said transmitting the address information registering message further includes: waiting for the originator's selection of an address book menu and displaying the address information from the address book of an internal memory; and waiting for the originator's selection of address information and adding the selected address information to the content of the short message.

Still more preferably, said registering the transmission information with the address book includes: receiving a short message from the originating mobile communication terminal and checking whether the short message is the address information registering message by extracting the identifier from the short message; searching terminal information of the called mobile communication terminal to check whether or not the address information registering message service is available at the mobile communication terminal; checking whether or not an automatic storage function for the address information is set up; extracting the address information from the address information registering message receiving from the originating mobile communication terminal and checking whether or not the extracted address information exists in the address book of an internal memory; and registering the extracted address information with the address book of the internal memory when the extracted address information does not exist in the address book of the internal memory.

Preferably, said registering the transmission information with the address book, further comprises, when the automatic storage function for the address information is not set up, casting a question about whether or not the recipient stores the address information through a display screen and checking whether or not the recipient selects registration of the address information, by waiting for the recipient's key input.

In order to accomplish these objects, according to another aspect of the present invention, there is provided a method of automatically address information of a mobile communication terminal, including: generating an address information registering message at an originating mobile communication terminal by adding an identifier to transmission information and transmitting the address information registering message from the originating mobile communication terminal; a short message service center's checking whether or not an address information registering message service is available at a called mobile communication terminal in order to receive the address information registering message and to transmit the address information registering message to the called mobile communication terminal; and the called mobile communication terminal's receiving the address information registering message through the short message service center (SMSC) to register the transmission information with an address book.

Preferably, said transmitting the address information registering message, includes: waiting for an originator's selection of a menu of 'sending address information'; displaying an input screen and receiving the address information to be added to a content of a short message by the originator's input; and generating the address information registering message by adding the identifier to the short message and transmitting the generated address information registering message to the SMSC.

More preferably, said transmitting the address information registering message, further includes: waiting for the originator's selection of an address book menu and displaying the address information from the address book of an internal memory; and waiting for the operator's selection of address information and adding the selected address information to the content of the short message.

Still more preferably, said checking whether or not the address information registering message service is available, includes: receiving a short message from the originating mobile communication terminal and checking whether the short message is the address information registering message by extracting the identifier from the short message; checking whether or not the address information registering message service is available at the called mobile communication terminal through terminal information registered with a database; and transmitting the address information registering message received from the originating mobile communication terminal to the called mobile communication terminal.

Preferably, said checking whether or not the address information registering message service is available at the called mobile communication terminal, further includes, when the address information registering message service is not available, transmitting a return message from the called mobile communication terminal to the originating mobile communication terminal and informing the originating mobile communication terminal that registration of the address information is not accepted.

Preferably, said registering the transmission information with an address book, includes: receiving the short message through the SMSC to check whether or not an automatic storage function for the address information is set up; extracting the address information from the address information registering message received through the SMSC and checking whether or not the extracted address information exists in the address book of an internal memory; and registering the extracted address information with the address book of the internal memory when the extracted address information does not exist in the address book of the internal memory.

Alternatively, said checking whether or not the address information registering message service is available at the called mobile communication terminal, includes: receiving a short message from the originating mobile communication terminal and checking whether or not the address information registering message service is available at the called mobile communication terminal through terminal information registered with a database; and transmitting the address information registering message received from the originating mobile communication terminal to the called mobile communication terminal.

Further alternatively, said registering the transmission information with an address book, includes: receiving a short message through the short message service center and checking whether the short message is the address information registering message by extracting the identifier from the short message; checking whether or not an automatic storage function for the address information is set up; extracting the address information from the address information registering message received through the SMSC, and checking whether or not the extracted address information exists in the address book of an internal memory; and registering the extracted address information with the address book of the internal memory when the extracted address information does not exist in the address book of the internal memory.

Furthermore, alternatively, said registering the transmission information with an address book, further includes, when the automatic storage function for the address information is not set up, casting a question about whether or not the recipient stores the address information through a display screen and checking whether or not the recipient selects registration of the address information, by waiting for the recipient's key input.

BRIEF DESCRIPTION OF THE DRAWINGS

The above and other objects, features and advantages of the present invention will be more apparent from the following detailed description taken in conjunction with the accompanying drawings, in which:

FIG. 5 is a flow chart showing the step of registering the address information in FIG. 2.

DETAILED DESCRIPTION OF THE INVENTION

Figure 1:
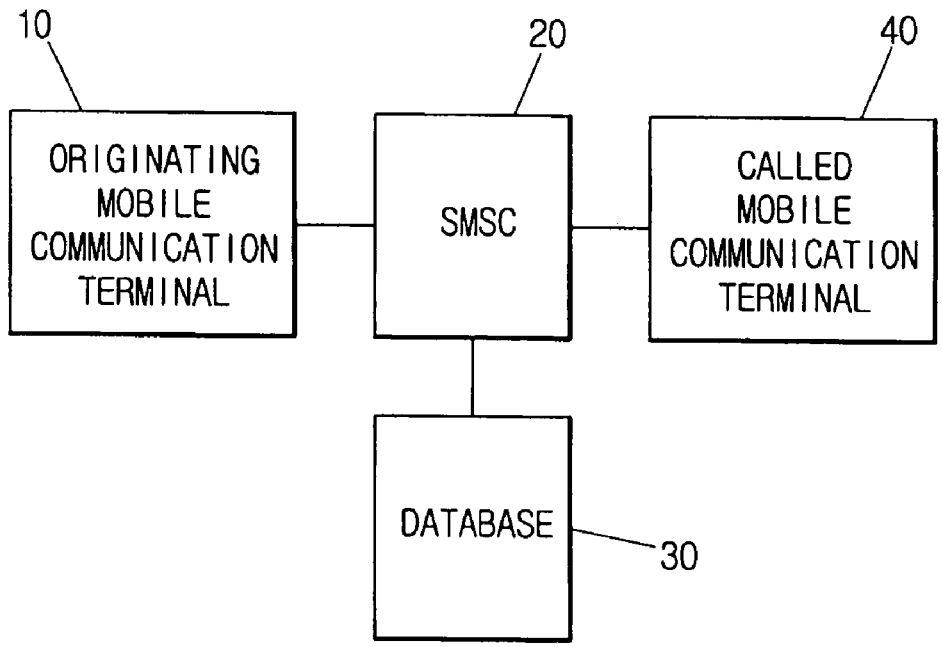
FIG. 1 is a block diagram showing a configuration of a system for automatically registering address information of a mobile communication terminal according a preferred embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

A system for automatically registering address information of a mobile communication terminal according to the present invention is designed to automatically register the address information, which an originator intends to send with the use of a short message service, with an address book of a mobile communication terminal of a recipient by processing the address information into a specific format of short message containing an identifier, and as shown in FIG. 1, is composed of an originating mobile communication terminal 10, a short message service center (SMSC) 20, a database 30, and a called mobile communication terminal 40.

The originating mobile communication terminal 10 processes transmission information which the originator intends to send, for example a phone number, into a predetermined format, adds a special identifier (e.g., a tele-service identifier) to the processed transmission information, and generates and transmits a short message, namely, an address information registering message. Here, the transmission information may refer to a phone number of the originator, a phone number registered with the address book of the originating mobile communication terminal 10, or a phone number inputted directly by the originator.

To mutually register the address information between users using the short message, the originating mobile communication terminal 10 includes an interface and a display (for convenience' sake of description, not shown in the drawing) providing convenience of simply manipulating a menu to the user, and a transmitting section (for convenience' sake of description, not shown in the drawing) adding the special identifier for registering the address information to the short message or adding the predetermined format to a content of the short message and generating and transmitting an address information registering message.

The SMSC 20 receives the predetermined format of short message for registering the address information from the originating mobile communication terminal 10 and transmits the received short message to the called mobile communication terminal 40, thus registering the address information. In other words, the SMSC 20 checks whether the called mobile communication terminal 40 is a terminal capable of using an address information registering message service by means of the database 30.

The database 30 functions to store and manage information on the mobile communication terminals 10 and 40 (e.g., information on the terminal capable of using the address information registering message service).

The called mobile communication terminal 40 receives the short message through the SMSC 20. Specifically, after receiving the address information registering message through the SMSC 20, the called mobile communication terminal 40 registers the transmission information of the originator (e.g., the phone number) with the address book of an internal memory.

Further, to mutually register the address information between users using the short message, the called mobile communication terminal 40 includes an interface and the display (for convenience' sake of description, not shown in the drawing) providing convenience of simply manipulating the menu to the user, and a receiving section (for convenience' sake of description, not shown in the drawing) interpreting the address information registering message when the registration message is received and registering the transmission information with the address book of the internal memory.

A method of automatically registering address information of a mobile communication terminal according to a preferred embodiment of the present invention will be described in brief under the assumption that the SMSC 20 is not provided.

The originating mobile communication terminal 10 generates the address information registering message by adding the special identifier to the transmission information which the originator intends to send, that is the address information, and transmits the generated address information registering message to the called mobile communication terminal 40.

Thus, the called mobile communication terminal 40 receives the address information registering message from the originating mobile communication terminal 10, detects a version which is recorded in the memory of the called mobile communication terminal 40, checks whether or not the called mobile communication terminal 40 is the terminal capable of using the address information registering message service, extracts the transmission information of the originator, i.e., the address information, from the address information registering message, and registers the extracted transmission information with the address book of the internal memory.

Here, if the called mobile communication terminal 40 is not the terminal capable of using the address information registering message service, the called mobile communication terminal 40 generates a return message and transmits the generated return message to the originating mobile communication terminal 10. Thereby, the called mobile communication terminal 40 informs the originating mobile communication terminal 10 that the called mobile communication terminal 40 is not the terminal capable of using the address information registering message service.

Figure 2:
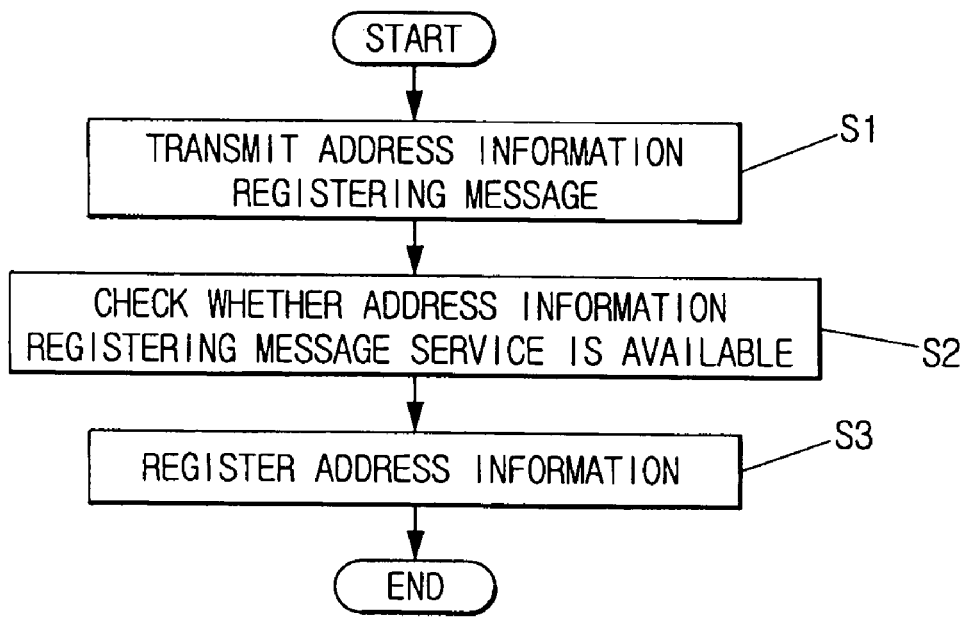
FIG. 2 is a flow chart showing a method of automatically registering address information of a mobile communication terminal according a preferred embodiment of the present invention.

Meanwhile, the method of automatically registering address information of a mobile communication terminal according to a preferred embodiment of the present invention will be described below with reference to the flow chart of FIG. 2.

First, at the originating mobile communication terminal 10, the special identifier is added to the transmission information which the originator intends to send, namely, the address information, and that the address information registering message is generated and transmitted to the SMSC 20 (S1).

Then, at the SMSC 20, the address information registering message is received from the originating mobile communication terminal 10 to ascertain the called mobile communication terminal 40. It is checked whether the ascertained called mobile communication terminal 40 is the terminal capable of using the address information registering message service by means of terminal information registered with the database 30. Then, the received address information registering message is transmitted to the ascertained called mobile communication terminal 40 (S2).

Thus, at the called mobile communication terminal 40, it is checked whether or not the short message received through the SMSC 20 is the address information registering message, and the transmission information of the originator, the address information, is extracted from the address information registering message and is registered with the address book of the internal memory (S3).

Figure 3:
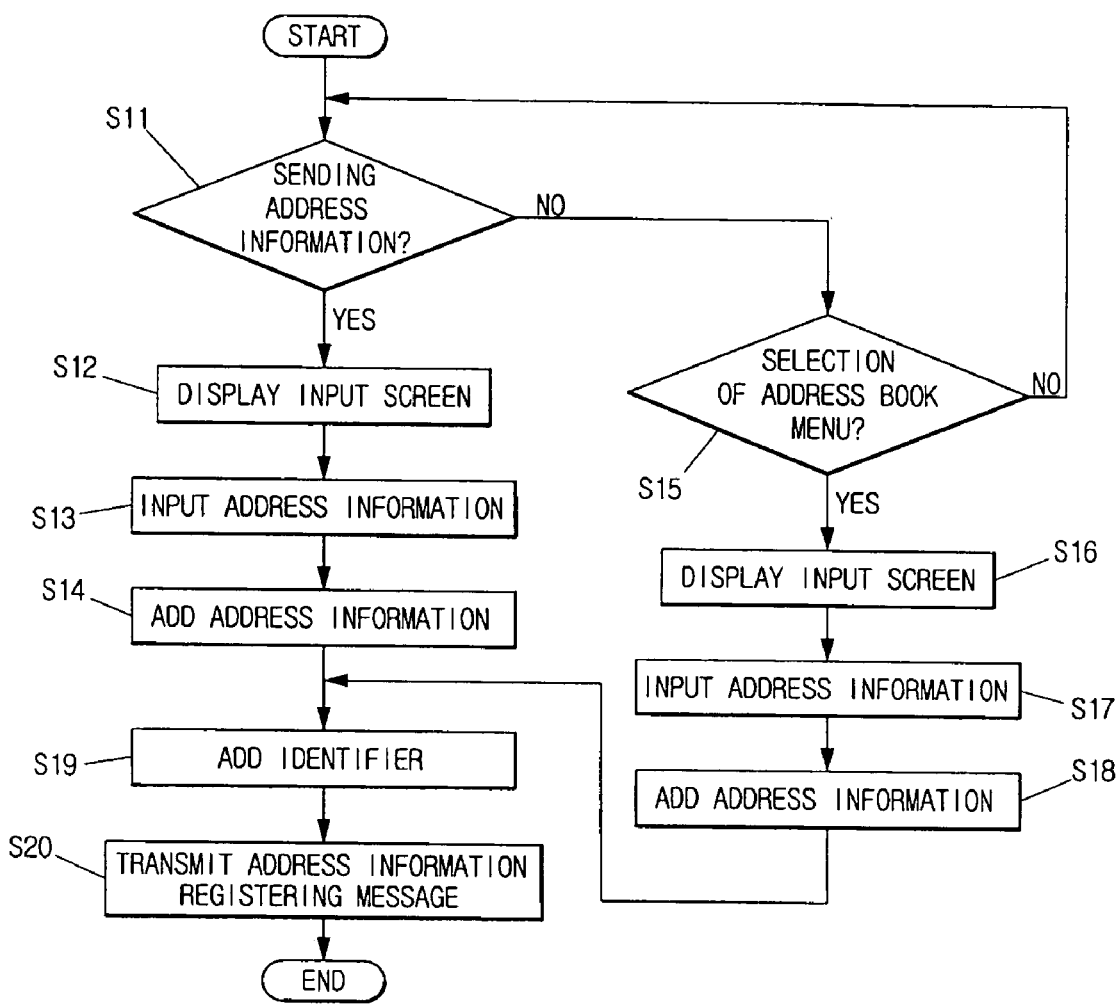
FIG. 3 is a flow chart showing the step of transmitting the address information registering message in FIG. 2.

First, the first step S1 for transmitting the address information registering message will be described in detail with reference to the flow chart of FIG. 3 as follows.

Above all, there are two modes for adding the transmission information intended to be sent by the originator (i.e., the address information) to the short message, one mode for directly inputting the address information (e.g., name, phone number, etc.) and the other for selecting the address information from the address book of the internal memory.

For this reason, it is checked whether a key for 'sending address information' is inputted from the menu displayed on a display screen of the originating mobile communication terminal 10 by the originator (S11).

Here, when the menu of 'sending address information' is selected in the step S11, this is the case of directly inputting the address information. An input screen is displayed, and then the originator can input the address information through the input screen (S12).

Thus, if the originator inputs the address information through the input screen, the inputted address information is checked (S13). The inputted address information is added to be capable of being used as the short message (S14).

However, when the menu of 'sending address information' is not selected in the step S11, it is checked whether a key for 'address book' is selected from the menu (S15). Here, when the menu of 'address book' is selected, this is the case of selecting the address information from the address book of the internal memory. The address information is displayed from the address book of the internal memory to enable the originator to select at least one from the displayed address information (S16).

Thus, if the originator selects at least one address information from the displayed address information, the selected address information is checked (S17). The selected address information is added to be capable of being used as the short message (S18).

Then, the special identifier (e.g., tele-service identifier) is added to the added address information to inform that a short message including the special identifier is an address information registering message (S19). Thereby, the address information registering message is generated and transmitted to the SMSC 20 (S20).

Figure 4:
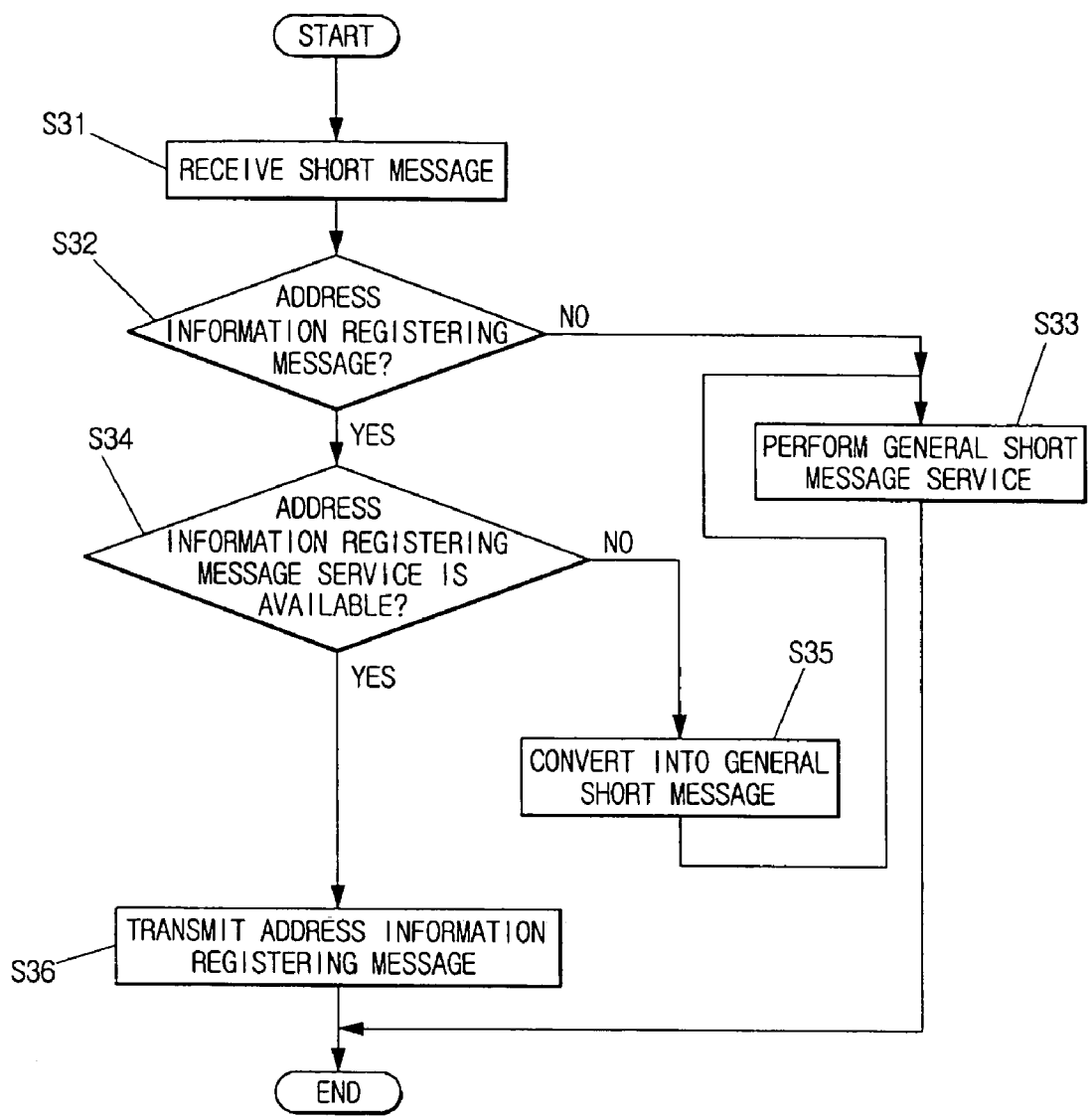
FIG. 4 is a flow chart showing the step of checking whether or not the address information registering message service is available in FIG. 2.

Second, the second step S2 of checking whether or not the address information registering message service is available will be described in detail with reference to the flow chart of FIG. 4 as follows.

Among other things, at the SMSC 20, the short message is received from the originating mobile communication terminal 10 (S31). The identifier is extracted from the received short message, and it is checked whether or not the received short message is the address information registering message (S32).

Here, if the received short message is not the address information registering message as a result of the step S32, the received short message is used as the general short message to perform the short message service similarly to the prior art (S33). However, if the received short message is the address information registering message, the called mobile communication terminal 40 is ascertained from the received address information registering message. It is checked whether or not the ascertained called mobile communication terminal 40 is the terminal capable of using the address information registering message service through the terminal information registered with the database 30 (S34).

If the called mobile communication terminal 40 is not the terminal capable of using the address information registering message service in the step S34, the received address information registering message is converted into the general short message (S35) and then the step 33 is performed again. Further, the called mobile communication terminal 40 generates a return message and transmits the generated return message to the originating mobile communication terminal 10, thereby informing the originating mobile communication terminal 10 that the called mobile communication terminal 40 is not the terminal capable of using the address information registering message service.

However, if the called mobile communication terminal 40 is the terminal capable of using the address information registering message service in the step S34, the received address information registering message is transmitted to the ascertained called mobile communication terminal 40 (S36).

Alternatively, the operations from the step S31 to the step S33 may not be performed, namely may be performed in the step S3, and then operations from the step S34 to the step S36 may be performed.

Third, the step S3 of registering the address information will be described in detail with reference to the flow chart of FIG. 5 as follows.

At the called mobile communication terminal 40, in the case that the operations from the step S31 to the step S33 has been performed, the operations in FIG. 5 do no longer need to be performed at the SMSC 20. On the contrary, in the case that the operations from the step S31 to the step S33 has not been performed, the operations in FIG. 5 are performed.

Specifically, the short message is received through the SMSC 20 (S41). The identifier is extracted from the received short message, and it is checked whether or not the received short message is the address information registering message (S42).

Here, if the received short message is not the address information registering message as a result of the step S42, the received short message is used as the general short message to perform the short message service similarly to the prior art (S43). However, if the received short message is the address information registering message, environment of the called mobile communication terminal 40 is checked whether or not an automatic storage function designed to automatically store the received address information registering message is set up by the recipient (S44).

Then, if the automatic storage function is not set up, a question about whether or not the recipient stores the address information is cast through the display screen of the called mobile communication terminal 40, and then it is checked whether the recipient inputs a key for registering the address information (S45).

Thus, when the automatic storage function is set up in the step S44 and when it is ascertained that the recipient inputs a key for registering the address information in the step S45, the transmission information of the originator, the address information, is extracted from the address information registering message received through the SMSC 20 (S46), and then it is checked whether or not the extracted address information exists in the address book of the internal memory of the called mobile communication terminal 40 (S47).

However, if the extracted address information does not exist in the address book of the internal memory of the called mobile communication terminal 40 in the step S47, the extracted address information is registered with the address book of the internal memory (S48).

Meanwhile, there is a possibility that a plurality of contents (i.e., address information) are registered with the address book of the internal memory by application of the method of automatically registering address information of the mobile communication terminal according to the preferred embodiment of the present invention as set forth above. For example, a plurality of phone numbers may be transmitted to the called mobile communication terminal 40 according to a length of the short message.

As can be seen from the foregoing, the short message containing the phone number at the mobile communication terminal is transmitted to the correspondent, and thus the phone number is automatically registered with the address book of the correspondent mobile communication terminal. Thereby, it is convenient for the user to register the address information, which is allowed to satisfy requests of the user caused by increase of the short message service.

The invention claimed is:

1. A method of automatically registering address information of a mobile communication terminal, comprising:
generating an address information registering message at an originating mobile communication terminal by adding an identifier to transmission information and transmitting the address information registering message from the originating mobile communication terminal;
at a called mobile communication terminal, receiving the address information registering message, checking whether or not an address information registering message service is available, and registering the transmission information with an address book; and
when the address information registering message service is not available, transmitting a return message from the called mobile communication terminal to the originating mobile communication terminal and informing the originating mobile communication terminal that registration of the address information is not accepted.

2. A method of automatically registering address information of a mobile communication terminal, comprising:
generating an address information registering message at an originating mobile communication terminal by adding an identifier to transmission information and transmitting the address information registering message from the originating mobile communication terminal; and
at a called mobile communication terminal, receiving the address information registering message, checking whether or not an address information registering message service is available, and registering the transmission information with an address book,
wherein said transmitting the address information registering message comprises:
waiting for an originator's selection of a menu of 'sending address information';
displaying an input screen and receiving the address information to be added to a content of a short message by the originator's input; and
generating the address information registering message by adding the identifier to the short message and transmitting the generated address information registering message to the called mobile communication terminal.

3. The method of claim 2, wherein said transmitting the address information registering message further comprises:
waiting for the originator's selection of an address book menu and displaying the address information from the address book of an internal memory; and
waiting for the originator's selection of address information and adding the selected address information to the content of the short message.

4. A method of automatically registering address information of a mobile communication terminal, comprising:
generating an address information registering message at an originating mobile communication terminal by adding an identifier to transmission information and transmitting the address information registering message from the originating mobile communication terminal; and
at a called mobile communication terminal, receiving the address information registering message, checking whether or not an address information registering message service is available, and registering the transmission information with an address book,
wherein said registering the transmission information with the address book, comprises:
receiving a short message from the originating mobile communication terminal and checking whether the short message is the address information registering message by extracting the identifier from the short message;
searching terminal information of the called mobile communication terminal to check whether or not the address information registering message service is available at the called mobile communication terminal;
checking whether or not an automatic storage function for the address information is set up;
extracting the address information from the address information registering message received from the originating mobile communication terminal and checking whether or not the extracted address information exists in the address book of an internal memory; and
registering the extracted address information with the address book of the internal memory when the extracted address information does not exist in the address book of the internal memory.

5. The method of claim 4, wherein said registering the transmission information with the address book, further comprises, when the automatic storage function for the address information is not set up, casting a question about whether or not the recipient stores the address information through a display screen and checking whether or not the recipient selects registration of the address information, by waiting for the recipient's key input.

6. A method of automatically registering address information of a mobile communication terminal, comprising:
generating an address information registering message at an originating mobile communication terminal by adding an identifier to transmission information and transmitting the address information registering message from the originating mobile communication terminal;
a short message service center's checking whether or not an address information registering message service is available at a called mobile communication terminal in order to receive the address information registering message and to transmit the address information registering message to the called mobile communication terminal; and
the called mobile communication terminal's receiving the address information registering message through the short message service center (SMSC) to register the transmission information with an address book,
wherein said transmitting the address information registering message, comprises:
waiting for an originator's selection of a menu of 'sending address information';
displaying an input screen and receiving the address information to be added to a content of a short message by the originator's input; and
generating the address information registering message by adding the identifier to the short message and transmitting the generated address information registering message to the short message service center.

7. The method of claim 6, wherein said transmitting the address information registering message, further comprises:
waiting for the originator's selection of an address book menu and displaying the address information from the address book of an internal memory; and
waiting for the originator's selection of address information and adding the selected address information to the content of the short message.

8. A method of automatically registering address information of a mobile communication terminal, comprising:
    generating an address information registering message at an originating mobile communication terminal by adding an identifier to transmission information and transmitting the address information registering message from the originating mobile communication terminal;
    a short message service center's checking whether or not an address information registering message service is available at a called mobile communication terminal in order to receive the address information registering message and to transmit the address information registering message to the called mobile communication terminal; and
    the called mobile communication terminal's receiving the address information registering message through the short message service center (SMSC) to register the transmission information with an address book,
    wherein said checking whether or not the address information registering message service is available, comprises:
    receiving a short message from the originating mobile communication terminal and checking whether the short message is the address information registering message by extracting the identifier from the short message;
    checking whether or not the address information registering message service is available at the called mobile communication terminal through terminal information registered with a database; and
    transmitting the address information registering message received from the originating mobile communication terminal to the called mobile communication terminal.

9. The method of claim 8, wherein said checking whether or not address information registering message service is available at the called mobile communication terminal, further comprises, when the address information registering message service is not available, transmitting a return message from the called mobile communication terminal to the originating mobile communication terminal and informing the originating mobile communication terminal that registration of the address information is not accepted.

10. A method of automatically registering address information of a mobile communication terminal, comprising:
    generating an address information registering message at an originating mobile communication terminal by adding an identifier to transmission information and transmitting the address information registering message from the originating mobile communication terminal;
    a short message service center's checking whether or not an address information registering message service is available at a called mobile communication terminal in order to receive the address information registering message and to transmit the address information registering message to the called mobile communication terminal; and
    the called mobile communication terminal's receiving the address information registering message through the short message service center (SMSC) to register the transmission information with an address book,
    wherein said registering the transmission information with an address book, comprises:
    receiving the short message through the short message service center to check whether or not an automatic storage function for the address information is set up;
    extracting the address information from the address information registering message received through the short message service center and checking whether or not the extracted address information exists in the address book of an internal memory; and
    registering the extracted address information with the address book of the internal memory when the extracted address information does not exist in the address book of the internal memory.

11. A method of automatically registering address information of a mobile communication terminal, comprising:
    generating an address information registering message at an originating mobile communication terminal by adding an identifier to transmission information and transmitting the address information registering message from the originating mobile communication terminal;
    a short message service center's checking whether or not an address information registering message service is available at a called mobile communication terminal in order to receive the address information registering message and to transmit the address information registering message to the called mobile communication terminal; and
    the called mobile communication terminal's receiving the address information registering message through the short message service center (SMSC) to register the transmission information with an address book,
    wherein said checking whether or not the address information registering message service is available at the called mobile communication terminal, comprises:
    receiving a short message from the originating mobile communication terminal and checking whether or not the address information registering message service is available at the called mobile communication terminal through terminal information registered with a database; and
    transmitting the address information registering message received from the originating mobile communication terminal to the called mobile communication terminal.

12. A method of automatically registering address information of a mobile communication terminal, comprising:
    generating an address information registering message at an originating mobile communication terminal by adding an identifier to transmission information and transmitting the address information registering message from the originating mobile communication terminal;
    a short message service center's checking whether or not an address information registering message service is available at a called mobile communication terminal in order to receive the address information registering message and to transmit the address information registering message to the called mobile communication terminal; and
    the called mobile communication terminal's receiving the address information registering message through the short message service center (SMSC) to register the transmission information with an address book,
    wherein said registering the transmission information with an address book, comprises:
    receiving a short message through the short message service center, and checking whether the short message is the address information registering message by extracting the identifier from the short message;
    checking whether or not an automatic storage function for the address information is set up;
    extracting the address information from the address information registering message received through the short message service center, and checking whether or not the extracted address information exists in the address book of an internal memory; and registering the extracted address information with the address book of the internal memory when the extracted address information does not exist in the address book of the internal memory.

13. The method of claim 12, wherein said registering the transmission information with an address book, further comprises, when the automatic storage function for the address information is not set up, casting a question about whether or not the recipient stores the address information through a display screen and checking whether or not the recipient selects registration of the address information, by waiting for the recipient's key input.

* * * * *